(12) United States Patent
Riggs

(10) Patent No.: US 8,145,631 B2
(45) Date of Patent: Mar. 27, 2012

(54) CLIENT MANAGEMENT OF DOWNLOAD SEQUENCE OF ORCHESTRATED CONTENT

(75) Inventor: Brian Riggs, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 632 days.

(21) Appl. No.: 12/032,440

(22) Filed: Feb. 15, 2008

(65) Prior Publication Data
US 2011/0238660 A1    Sep. 29, 2011

Related U.S. Application Data

(60) Provisional application No. 60/911,635, filed on Apr. 13, 2007.

(51) Int. Cl.
*G06F 7/00* (2006.01)
*G06F 17/30* (2006.01)

(52) U.S. Cl. ........ 707/722; 707/726; 707/736; 707/748; 707/752; 707/758

(58) Field of Classification Search .................. 707/705, 707/736, 748, 752, 999.1, 722, 726, 758
See application file for complete search history.

(56) References Cited

U.S. PATENT DOCUMENTS

| | | | |
|---|---|---|---|
| 5,778,372 A * | 7/1998 | Cordell et al. | 707/999.1 |
| 7,761,423 B1 * | 7/2010 | Cohen | 707/637 |
| 2003/0033296 A1 * | 2/2003 | Rothmuller et al. | 707/3 |
| 2004/0205514 A1 * | 10/2004 | Sommerer et al. | 715/501.1 |
| 2004/0210829 A1 * | 10/2004 | Cristofari et al. | 715/501.1 |
| 2005/0234893 A1 * | 10/2005 | Hirsch | 707/3 |
| 2006/0259585 A1 * | 11/2006 | Keohane et al. | 709/219 |
| 2007/0011665 A1 * | 1/2007 | Gandhi et al. | 717/136 |
| 2007/0022174 A1 * | 1/2007 | Issa | 709/217 |
| 2007/0038712 A1 * | 2/2007 | Affronti et al. | 709/206 |
| 2007/0055660 A1 * | 3/2007 | Anderson | 707/4 |
| 2007/0245020 A1 * | 10/2007 | Ott | 709/225 |
| 2007/0245048 A1 * | 10/2007 | Mesut et al. | 710/105 |
| 2008/0056678 A1 * | 3/2008 | Kim | 386/95 |
| 2008/0104113 A1 * | 5/2008 | Wong et al. | 707/104.1 |
| 2008/0189752 A1 * | 8/2008 | Moradi et al. | 725/105 |

* cited by examiner

*Primary Examiner* — Hares Jami
(74) *Attorney, Agent, or Firm* — Kilpatrick Townsend & Stockton LLP

(57) ABSTRACT

Downloading resources according to a priority is disclosed. A feed document is retrieved. A feed document represents time-variant chunks of published content. The feed document is parsed to extract one or more references to a downloadable resource. A downloadable resource is a type of content identified by a reference within the feed document. A priority level is assigned to each reference. Priority levels may be assigned in a variety of ways, such as through a size of a resource identified by a reference or a file type of a resource. Priority levels may also be assigned to nestable resources and one or more resources contained therein. Resources for each extracted reference are then downloaded according to the assigned priority levels. A resource for a reference with a higher assigned priority level is downloaded before a resource for a reference with a lower assigned priority level.

18 Claims, 5 Drawing Sheets

CLIENT MANAGEMENT OF DOWNLOAD SEQUENCE OF ORCHESTRATED CONTENT

PRIORITY TO EARLIER FILED PROVISIONAL PATENT APPLICATION

This application claims the benefit of the filing date of earlier filed U.S. Provisional Patent Application having Ser. No. 60/911,635 entitled "Client Management Of Download Sequence Of Orchestrated Content", filed Apr. 13, 2007, and that shares co-inventorship with the present application. The entire teachings and contents of this Provisional Patent Application are hereby incorporated by reference herein in their entirety.

BACKGROUND

Really Simple Syndication (RSS) is an umbrella term for a handful of very similar eXtensible Markup Language (XML) syndication formats (e.g. RSS 1.0, RSS 2.0, Atom 1.0). An RSS Feed is an RSS/XML document that represents time-variant chunks of content published by an entity. Feeds may be of any type, though the most common are RSS feeds. For example, a typical RSS feed may be the entries published over time on a sports weblog (or "blog") that covers a variety of sports, or a variety of teams within the same sport. The feed for such a blog may include a variety of entries, posted throughout the day, where the subject of each entry is a different news item or discussion topic that focuses on a particular sport or team. Feeds typically include references to outside sources of content, such as, in the example sports blog given above, image files of team logos, audio files including interview clips with players on a team, and/or video files includes highlights from a sporting event that a particular team participated in. These different types of content may be referred to as resources.

Typically, a user subscribes to one or more feeds by using an application known as an aggregator, or a feed reader. An aggregator combines the contents of multiple feeds for display on a single viewing location. That is, an aggregator allows a single user to access the content of a number of feeds, such as a feed from a sports blog, a feed including the day's weather forecast, a feed from a news source, and the like, without having to visit (e.g., in the user's web browser), the source of each of those disparate types of information.

RSS aggregators download all resources referenced in a feed in an arbitrary order. RSS aggregators typically go through two stages when downloading content. First, an RSS aggregator downloads and parses the RSS feed. If the RSS feed contains references to other downloadable files (e.g., thumbnail images, podcasts, video files, etc.), then the aggregator will subsequently download these referenced files. This is a standard workflow for aggregators.

SUMMARY

Conventional mechanisms such as those explained above suffer from a variety of deficiencies. One such deficiency is that as RSS becomes a richer format for representing content, particularly rich media, the need for multiple download stages (beyond the two described in the background section) becomes greater. Whereas in RSS's earlier days feeds might contain nothing more complicated to download than a few podcasts, now an RSS feed might contain a reference to an external document which contains references to other downloadable pieces. A specific example is an RSS feed that contains a Synchronized Multimedia Integration Language (SMIL) document as an enclosure, where the SMIL document contains references to videos or thumbnail images that also need to be downloaded. SMIL is typically used for orchestrating the rendering and playback of multimedia content.

The problem in this new scenario revolves around the user experience. An RSS feed may contain a wide variety of downloadable files, some of which may need to be downloaded sooner than others, and some of which may take some time to download based on the user's bandwidth. For example, in feed containing both thumbnail images and videos, the thumbnail images associated with the feed may need to be displayed immediately after downloading the feed, so that the user has a visual representation of the content of the feed. In contrast, the videos may be downloaded later, since the User Interface (UI) associated with the videos often displays a progress bar, and the user expects videos to take longer to download. If the feed contains a SMIL enclosure (see above), the aggregator needs to download the SMIL document and validate it, that is, ensure that the SMIL document contains valid content, before presenting the item that references the SMIL document. An aggregator may choose to make an item invalid if anything within that item, even a nested reference, is invalid. Thus, an RSS aggregator should not simply download all of the files in the RSS feed in an arbitrary order, but rather should approach the ordering of downloads in an intelligent fashion.

Embodiments of the invention significantly overcome such deficiencies and provide mechanisms and techniques that provide client management of download sequence of orchestrated content. Embodiments approach RSS aggregation by ordering any downloads referenced in an RSS feed based on various criteria, such as user interface requirements and dependencies between downloads. By ordering the downloads referenced in a feed based on these criteria, embodiments ensure that the application presenting the feed to a user will download high priority resources first, and lower priority resources later. This type of approach contributes to the perception of a quick download, because the user's perception of speed will be predicated only on the download of the high priority resources. Further, embodiments allow an RSS aggregator to more intelligently retrieve arbitrarily nested resources, such as those found in a SMIL document.

More particularly, in an embodiment, there is provided a method of downloading resources according to a priority. The method includes retrieving a feed document, wherein a feed document represents time-variant chunks of published content, and parsing the feed document to extract one or more references to a downloadable resource, wherein a downloadable resource is a type of content identified by a reference within the feed document. The method also includes assigning a priority level to each reference, and downloading resources for each extracted reference according to the assigned priority levels, wherein a resource for a reference with a higher assigned priority level is downloaded before a resource for a reference with a lower assigned priority level.

In a related embodiment, parsing may include parsing the feed document to extract one or more references to a downloadable resource, wherein a downloadable resource is a type of content identified by a reference within the feed document; determining if any extracted references are references to a nestable resource; for any nestable resources, parsing a nestable resource to extract one or more references contained therein; and assigning may include assigning a priority level to each reference, wherein a priority level assigned to a reference within a nested resource includes a component based on the priority level assigned to the reference to the nested resource itself.

In another related embodiment, the method may include prior to assigning, determining a file type associated with the resource identified by each reference; and wherein assigning may include assigning a priority level to each reference, the priority level based upon the determined file type of the resource identified by that reference.

In still another related embodiment, the method may include prior to assigning, determining a size associated with the resource identified by each reference; and assigning may include assigning a priority level to each reference, the priority level based upon the determined size of the resource identified by that reference. In a further related embodiment, determining may include determining a file type associated with the resource identified by each reference; and relating each determined file type with a particular size, each related size corresponding to a priority level.

In yet still another related embodiment, the method may include prior to retrieving, subscribing to a feed document; and retrieving may include retrieving a preview of the feed document, wherein a feed document represents time-variant chunks of published content, and wherein the preview includes a layout of the feed document; and assigning may include assigning a priority level to each reference, the priority level based upon a position of the reference to the resource within the layout of the feed document. In a further related embodiment, assigning may include receiving a position of the feed document in a viewer, the position identifying a portion of the feed document currently displayed in the viewer; and assigning a priority level to each reference, the priority level based upon a position of the reference to the resource within the layout of the feed document and the received position of the feed document in the viewer, wherein references to resources located, according to the layout, in a portion of the feed document currently shown in the viewer are assigned a higher priority than references to references located, according to the layout, in a portion of the feed document not currently shown in the viewer.

In another embodiment, there is provided a computer program product, stored on computer readable medium, for downloading resources according to a priority. The computer program product includes computer program code for retrieving a feed document, wherein a feed document represents time-variant chunks of published content, and computer program code for parsing the feed document to extract one or more references to a downloadable resource, wherein a downloadable resource is a type of content identified by a reference within the feed document. The computer program product also includes computer program code for assigning a priority level to each reference, and computer program code for downloading resources for each extracted reference according to the assigned priority levels, wherein a resource for a reference with a higher assigned priority level is downloaded before a resource for a reference with a lower assigned priority level.

In another embodiment, there is provided a computer system. The computer system includes a memory; a processor; a display; an input device; and an interconnection mechanism coupling the memory, the processor, the display, and the input device, allowing communication there between. The memory is encoded with a resource priority downloading application, that when executed in the processor, provides a resource priority downloading process. The resource priority downloading process causes the computer system to perform the operations of: retrieving a feed document, wherein a feed document represents time-variant chunks of published content; parsing the feed document to extract one or more references to a downloadable resource, wherein a downloadable resource is a type of content identified by a reference within the feed document; assigning a priority level to each reference; and downloading resources for each extracted reference according to the assigned priority levels, wherein a resource for a reference with a higher assigned priority level is downloaded before a resource for a reference with a lower assigned priority level.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing client management of download sequence of orchestrated content as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that embodiments of the invention may be embodied strictly as a software program, as software and hardware, or as hardware and/or circuitry alone, such as within a data communications device. The features disclosed and explained herein may be employed in data communications devices and other computerized devices and software systems for such devices such as those manufactured by Adobe Systems, Incorporated, of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Generally, disclosed embodiments provide methods and apparatus for ordering content associated with a feed to be downloaded according to a priority. The ordering may be based on any number of criteria, such as but not limited to interface requirements and dependencies between downloads. By ordering the downloads based on these criteria, embodiments ensure that the high priority resources will be downloaded first, and lower priority resources will be downloaded later. This contributes to the perception of a quick download from a user's perspective, since the user's perception of speed will be predicated only on the download of the high priority resources. When a feed document is retrieved, the document is parsed such that all downloadable references (e.g., Universal Resource Locators or URLs) are extracted. These references are in some type of context, such as the type of each reference, and so it is possible to categorize each reference into a particular priority level. The downloading of resources is then initiated based on these priorities. Resources may be nested within other resources to any level of depth, and such nested resources will also be retrieved based on their assigned priorities.

Figure 1:
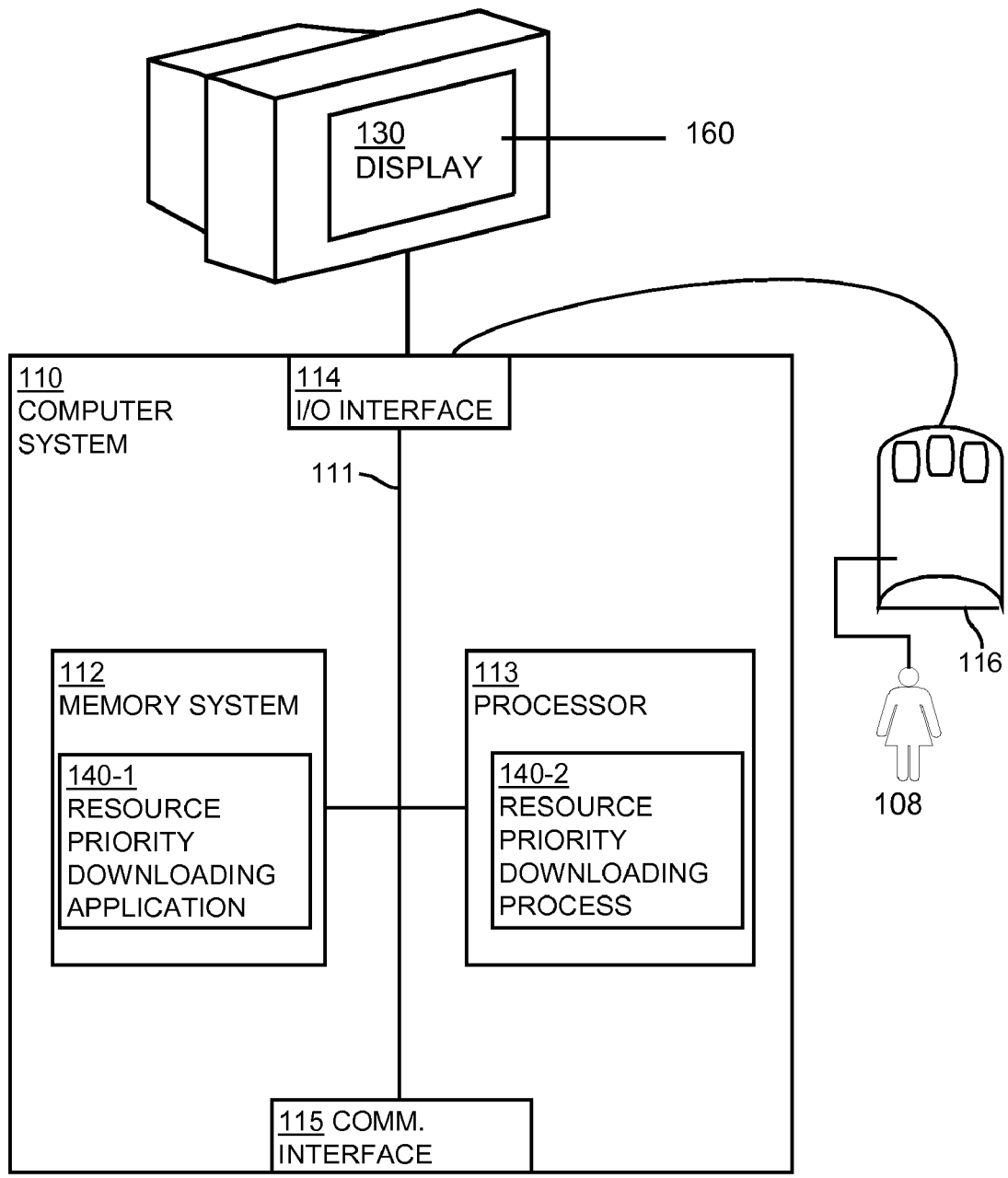
FIG. 1 shows a high-level block diagram of a computer system according to one embodiment disclosed herein.

More particularly, FIG. 1 is a block diagram illustrating example architecture of a computer system 110 that executes, runs, interprets, operates or otherwise performs a resource priority downloading application 140-1 and a resource priority downloading process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, touchpad, trackball, etc.) couples to the processor 113 through the I/O interface 114 and enables a user 108 such as a person who edits digital video files to provide input commands and generally control a graphical user interface 160 shown on a display 130. The communications interface 115 enables the computer system 110 to communicate with other devices (e.g., other computers) on a network (not shown in FIG. 1).

The memory system 112 is any type of computer readable medium and in this example is encoded with a resource priority downloading application 140-1. The resource priority downloading application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the resource priority downloading application 140-1. Execution of the resource priority downloading application 140-1 in this manner produces processing functionality in a resource priority downloading process 140-2. In other words, the resource priority downloading process 140-2 represents one or more portions or runtime instances of the resource priority downloading application 140-1 performing or executing within or upon the processor 113 in the computer system 110 at runtime.

It is noted that example configurations disclosed herein include the resource priority downloading application 140-1 itself including the resource priority downloading process 140-2 (i.e., in the form of un-executed or non-performing logic instructions and/or data). The resource priority downloading application 140-1 may be stored on a computer readable medium (such as a floppy disk), hard disk, electronic, magnetic, optical or other non-transitory computer readable medium. The resource priority downloading application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the resource priority downloading application 140-1 in the processor 113 as the resource priority downloading process 140-2. Those skilled in the art will understand that the computer system 110 may include other processes and/or software and hardware components, such as an operating system not shown in this example.

The display 130 need not be coupled directly to computer system 110. For example, the resource priority downloading application 140-1 may be executed on a remotely accessible computerized device via the network interface 115. In this instance, the graphical user interface 160 may be displayed locally to a user of the remote computer and execution of the processing herein may be client-server based.

FIGS. 2-5 are flowcharts of various embodiments of the resource priority downloading process 140-2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 2:
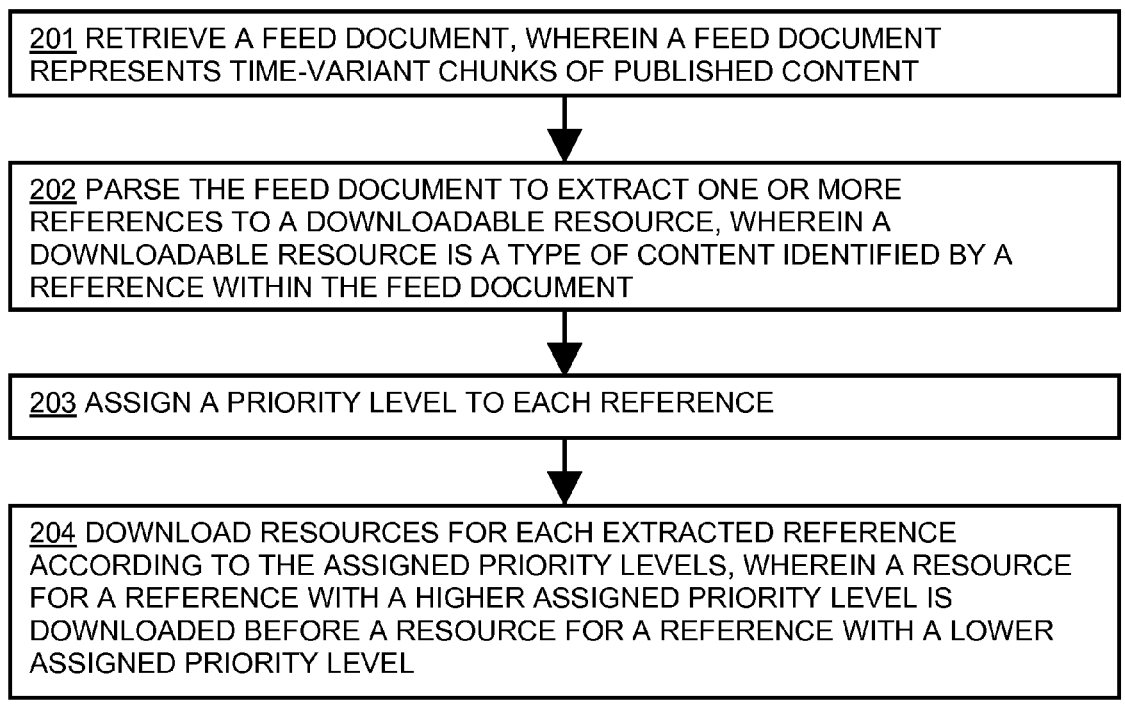
FIG. 2 illustrates a flowchart of a procedure performed by the system of FIG. 1 when ordering downloadable content by priority level.

FIG. 2 illustrates an embodiment of the resource priority downloading application 140-1, executing as the resource priority downloading process 140-2. The resource priority downloading process 140-2 is engaged either through input commands provided by a user (such as through the input device 116 shown in FIG. 1) or may be automatically engaged by an RSS aggregator or other feed document device or application, whenever content from a feed document is to be acquired. The resource priority downloading process 140-2 first retrieves a feed document, step 201. A feed document represents time-variant chunks of published content. That is, a feed document may include sources of information where the content of that source changes over a period of time. One example may thus be a feed of a weblog (a.k.a. "blog"), where new material (i.e., content) is published periodically. Other examples may include feeds of websites that provide information regarding news, the weather, and the like. Still other examples may include feeds of podcasts, or other similar organizations of audio, video, and/or multimedia content. Feed documents are typically in an RSS format or an RSS-related format, but may be in any appropriate format given to the presentation of information over a period of time, and are thus not so limited herein to being in RSS format. Within the feed document may be any number of references to downloadable resources, such as but not limited to, image files, audio files, video files, and the like, referenced by the feed document but not contained therein except by reference. The resource priority downloading process 140-2 then parses the feed document to extract one or more references to a downloadable resource, step 202. A downloadable resource is a type of content identified by a reference within the feed document. In some embodiments, a resource is an encapsulation of a uniform resource locator (URL) and some metadata about the resource (e.g., the MIME type of the content that comprises the resource). A reference is, for example, a universal resource locator, or URL, that is, a link or other pointer to content that is stored in, and downloadable from, a particular location. Extensions to a feed format (e.g., the Media RSS extension) may include references as well. When the resource priority downloading process 140-2 parses the feed, it obtains a list of resources from the feed and its extensions.

With the resources and their respective references identified, the resource priority downloading process 140-2 assigns a priority level to each reference, step 203. The priority level of a reference determines when the resource associated with that reference is downloaded. In other words, the resource priority downloading process 140-2 downloads resources for each extracted reference according to the assigned priority levels, step 204. A resource for a reference with a higher assigned priority level is downloaded by the resource priority downloading process 140-2 before a resource for a reference with a lower assigned priority level. The resource priority downloading process 140-2 may queue any resources for references with a lower assigned priority level to be downloaded when the resource priority downloading process 140-2 finishes downloading those resources for references with a higher assigned priority level.

As described in greater detail below, the resource priority downloading process 140-2 may assign priority levels in any number of ways, and according to any number or combination of criteria. In some embodiments, a priority level may be a distinct identifier, such that each reference in a feed document has its own distinct priority level assigned to it by the resource priority downloading process 140-2. Alternatively, in other embodiments, a priority level may be considered to be a bucket or a container, such that there are less (perhaps significantly less) priority levels than there are references in a feed document. In such situations, the resource priority downloading process 140-2 may assign a number of references within in the same feed document to the same priority level. The resource priority downloading process 140-2 may, in some embodiments, particularly where there are a large number of references all assigned by the resource priority downloading process 140-2 to the same priority level, further rank references within the priority level, using any appropriate techniques, including those described herein to assign a reference to a priority level.

Figure 3:
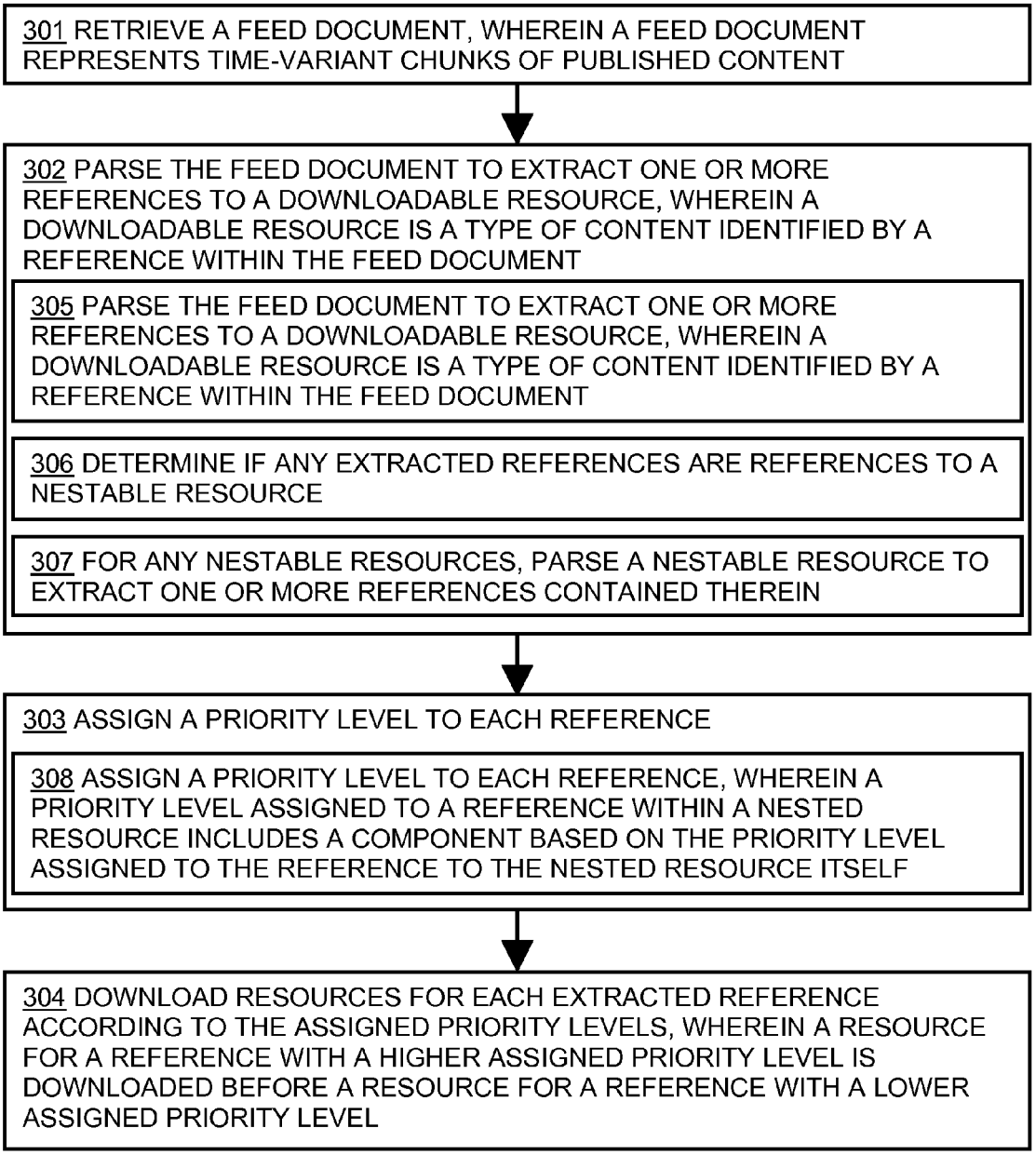
FIG. 3 illustrates a flowchart of a procedure performed by the system of FIG. 1 when encountering nested resources when ordering downloadable content by priority level.

In FIG. 3, the resource priority downloading process 140-2 assigns priority levels to resources including nested resources contained within a feed document. The resource priority downloading process 140-2 first retrieves a feed document, step 301, where, as described in detail above, a feed document represents time-variant chunks of published content. The resource priority downloading process 140-2 then parses the feed document to extract one or more references to a downloadable resource, step 302/305, where a downloadable resource is a type of content identified by a reference within the feed document. Here, the feed document may include one or more nestable resources, and so the resource priority downloading process 140-2 determines if any extracted references are references to a nestable resource, step 306. The resource priority downloading process 140-2 may be informed in advance that a feed document contains a nestable resource. For example, when parsing the feed document, the resource priority downloading process 140-2 may note that a reference to a resource identifies that resource as a nested resource, such as a SMIL document, by analyzing, for example, the MIME type of the resource. Determination of a nestable resource by the resource priority downloading process 140-2 causes the resource priority downloading process 140-2 to, for any nestable resources, parse a nestable resource to extract one or more references contained therein, step 307. The resource priority downloading process 140-2 may perform this parsing by using a preprocessor for the MIME type of the nested resource, such that the preprocessor returns a list of resources from within that nestable resource. For example, where the nestable resource is a SMIL document, the resource priority downloading process 140-2 may use a SMIL preprocessor to parse the SMIL document and return references to images, audio files, video files, etc. declared within the SMIL document. Thus, the list of available resources within the entirety of the feed document will include resources and nestable resources.

The resource priority downloading process 140-2 then assigns a priority level to each reference, step 303. Here, a priority level assigned by the resource priority downloading process 140-2 to a reference within a nested resource includes a component based on the priority level assigned to the reference to the nested resource itself, step 308. That is, a resource that is a nested resource is not necessarily assigned the same priority level as an equal or equivalent resource that is not nested. For example, an image file located within the feed document may be assigned the highest priority level by the RPDP, whereas a nested image file located within the feed document may be assigned the second highest priority level by the RPDP, such that all non-nested image files are downloaded first, followed by all nested image files. In some embodiments, where a feed document only contains nested (or nestable) resources, such differences would not be present. Note that, by using a preprocessor based on each MIME type, the resource priority downloading process 140-2 is scalable to support new types of downloadable references.

Finally, the resource priority downloading process 140-2 downloads resources for each extracted reference according to the assigned priority levels, wherein a resource for a reference with a higher assigned priority level is downloaded before a resource for a reference with a lower assigned priority level, step 304.

Figure 4:
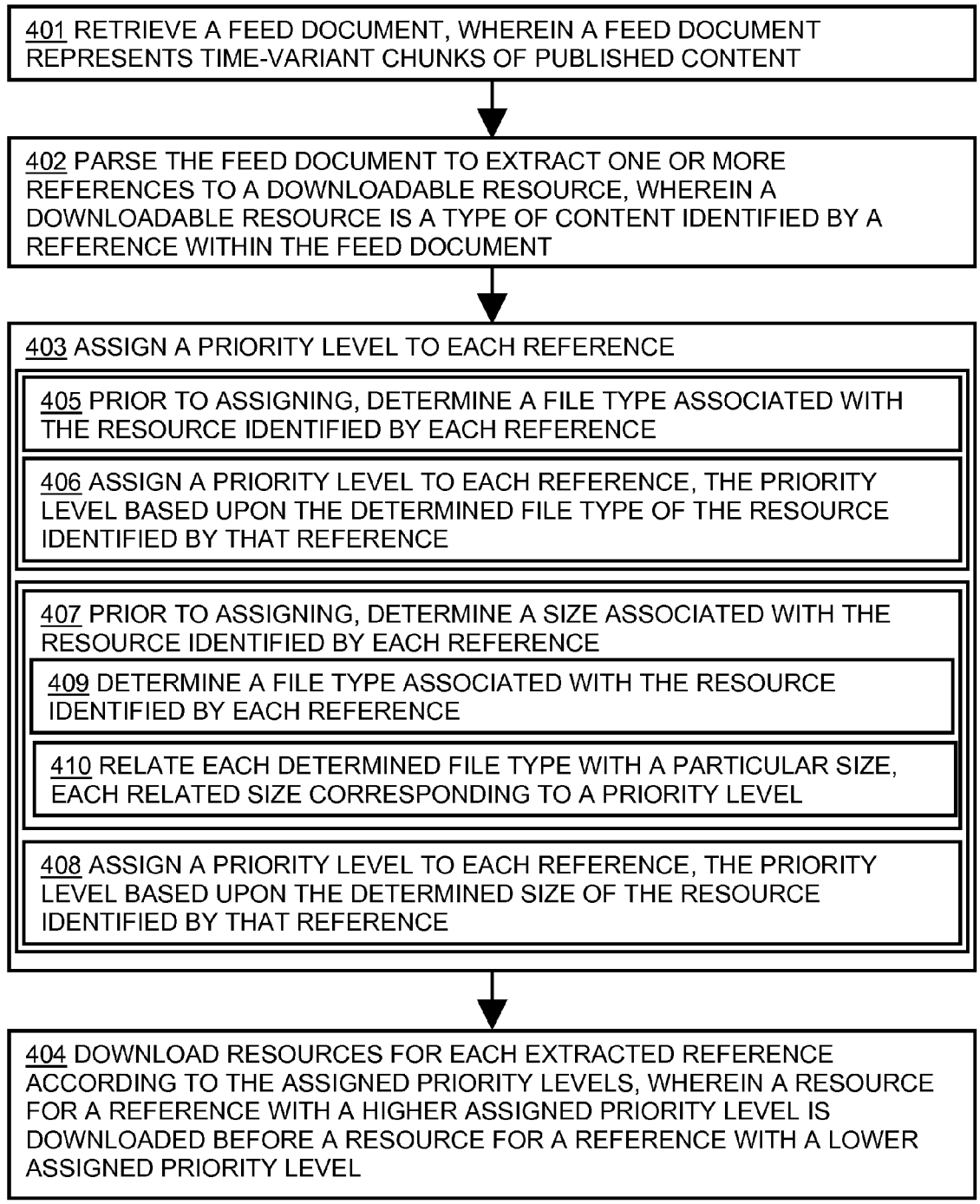
FIG. 4 illustrates a flowchart of a procedure performed by the system of FIG. 1 when determining priority level used to order downloadable content by file type, size, or a combination thereof.

FIG. 4 illustrates embodiments of the resource priority downloading process 140-2 where the resource priority downloading process 140-2 assigns priority levels to references based on information about the references. The resource priority downloading process 140-2 begins by retrieving a feed document, wherein a feed document represents time-variant chunks of published content, step 401. The resource priority downloading process 140-2 then parses the feed document to extract one or more references to a downloadable resource, wherein a downloadable resource is a type of content identified by a reference within the feed document, step 402. In some embodiments, prior to assigning a priority level to each reference, step 403, the resource priority downloading process 140-2 first determines a file type associated with the resource identified by each reference, step 405. For example, each reference to a resource may include the MIME type of the resource (i.e., content), such as, but not limited to, an image file (JPEG, GIF, TIF), a video file (MPG, DIVX), an audio file (MP3, WMA), or the like. The resource priority downloading process 140-2 is then able to use this information to assign priority levels to references. That is, the resource priority downloading process 140-2 assigns a priority level to each reference, the priority level based upon the determined file type of the resource identified by that reference, step 406. For example, the resource priority downloading process 140-2 may be preset to assign the highest available priority level to resources that are image files, because a user typically expects that an image file is a small file in terms of size (in comparison to audio and video files) and thus takes only a short amount of time to download. Similarly, the resource priority downloading process 140-2 may be preset to assign a mid-level priority level to audio files, which are typically larger than image files and thus are expected to take longer to download, and the resource priority downloading process 140-2 may be preset to assign its lowest priority level to video files, which are typically the largest type of file and thus are expected to take the longest to download. Alternatively, a user may be able to configure the relationship within the resource priority downloading process 140-2 that correlates a file type with a download priority level. In such situations, the user may desire, for example, to see video files before hearing audio files, and thus may arrange the priority levels such that the resource priority downloading process 140-2 downloads any video files in a feed document before the resource priority downloading process 140-2 downloads any audio files in that feed document.

In some embodiments, a feed document may contain multiple versions of the same file, that is, content that is rendered in a plurality of file formats. For example, a video file in a feed document may be rendered in Windows® Media format, Quicktime® format, and Flash® Video format, such that there are three available versions of the same content. The resource priority downloading process 140-2 may assign different priority levels to the three format versions, even though the content contained within each version is the same. That is, the resource priority downloading process 140-2 may assign a higher priority level to the Flash® Video format, a mid-level priority level to the Quicktime® format, and a low priority level to the Windows® Media format. The resource priority downloading process 140-2, in some embodiments, may base this assignment on whether or not the application that provides a view of the feed to the user is able to play a particular file format. Thus, if the viewing application is unable to play the Quicktime® format version, the resource priority downloading process 140-2 may assign it a low priority level, or may fail to assign it a priority level at all, such that the Quicktime® format version is not downloaded. Though the provided examples here related to video files, the same process may be applied to any other type of file. Further, in some embodiments, the assignment of the differing priority levels to different versions of the same content by the resource priority downloading process 140-2 may be based on user-provided input. That is, in some embodiments, the resource priority downloading process 140-2 may detect that different versions of the same content are available in a feed document, and then prompt the user for instructions on how to assign priority levels to those different versions.

The resource priority downloading process 140-2 need not rely on file size to assign priority levels to references to resources. In some embodiments, the resource priority downloading process 140-2 may instead make use of the size of the resource to assign a priority level. That is, prior to assigning a priority level, step 403, the resource priority downloading process 140-2 may determine a size associated with the resource identified by each reference, step 407. The size associated with a resource may be identified within metadata connected to the reference of the resource, or may be discoverable in any known way. The resource priority downloading process 140-2 would then assign a priority level to each reference, the priority level based upon the determined size of the resource identified by that reference, step 408. For example, the resource priority downloading process 140-2 may be configured to assign the highest priority level to the smallest resource in terms of size, and the second highest priority level to the second smallest resource in terms of size, and so on. Alternatively, the resource priority downloading process 140-2 may assign the highest priority level to the largest resource in terms of size, and then assign successively lower priority levels all the way down to the smallest resource in terms of size. In some embodiments, the resource priority downloading process 140-2 may assign priority levels to a range of sizes. That is, for example, any resource sized between one kilobyte and 200 kilobytes may be assigned the highest priority level, while a resource sized between 50 megabytes and 200 megabytes may be assigned the lowest priority level. These ranges may be preset within the resource priority downloading process 140-2, may be provided based on user input, or may be determined by the resource priority downloading process 140-2 itself based on the available data regarding the size of all the resources in a feed document.

In some embodiments, the resource priority downloading process 140-2 may make use of both the file type and size of a resource to assign a priority level to the reference for that resource. That is, the resource priority downloading process 140-2 would determine a file type associated with the resource identified by each reference, step 409, and relate each determined file type with a particular size, each related size corresponding to a priority level, step 410. In some embodiments, the resource priority downloading process 140-2 may thus create an association between file type and size, where size is already correlated to a priority level. For example, the resource priority downloading process 140-2 may associate image files with small sizes (i.e., less than two megabytes), audio files with medium sizes (e.g., between two and five megabytes), and video files with large sizes (e.g., between five and two hundred megabytes). Small size files may correspond to the highest priority level, medium size files may correspond to the mid-level priority level, and large size files may correspond to the lowest priority level, according to the resource priority downloading process 140-2. It is possible that a file of a particular type may fall outside the size range related to that type, and yet still be assigned a priority level by the resource priority downloading process 140-2 that corresponds to the size range. In other words, all resources that are image files may be related, by the resource priority downloading process 140-2, to a size range as described above (i.e., less than two megabytes), even if one or more of those image files are actually larger than two megabytes. Because the resource priority downloading process 140-2 is essentially assuming that any image file is going to be less than two megabytes in size, an image file larger than that size may still be assigned the highest priority level, while an audio file that is smaller than the image file may still be assigned the mid-level priority level.

This relationship may be reversed, that is, the resource priority downloading process 140-2 may first determine a file size associated with the resource identified by each reference, and then relate each determined file size with a particular type, each related type corresponding to a priority level. As described above, in some situations, this may cause the resource priority downloading process 140-2 to, for example, relate an audio file of five hundred kilobytes with an image file type, even though the content of that file is not an image, and thus assign it a high priority level. In other embodiments, the resource priority downloading process 140-2 may not correspond file types or sizes to priority levels until after determining the types of files and/or the ranges of file sizes for all resources in a feed document. This would allow the resource priority downloading process 140-2 to create its own priority level correspondence depending on the current feed document and the resources it contains.

However the resource priority downloading process 140-2 assigns priority levels to references, when that assigning is completed, the resource priority downloading process 140-2 downloads resources for each extracted reference according to the assigned priority levels, step 404. A resource for a reference with a higher assigned priority level is downloaded by the resource priority downloading process 140-2 before a resource for a reference with a lower assigned priority level.

Figure 5:
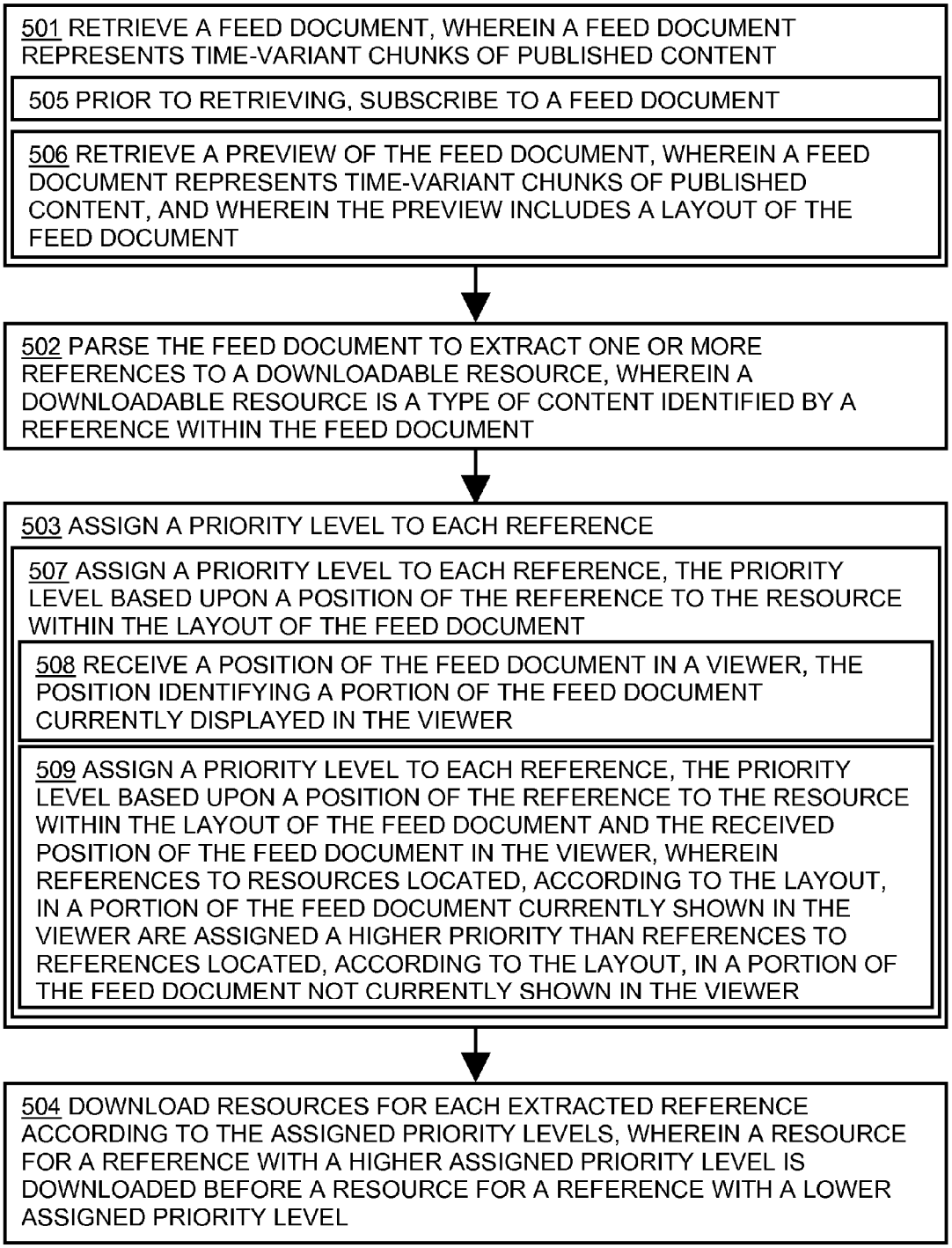
FIG. 5 illustrates a flowchart of a procedure performed by the system of FIG. 1 when determining priority level used to order downloadable content by the layout of a feed document, the position of a feed document in a viewer, or a combination thereof.

In FIG. 5, the resource priority downloading process 140-2 assigns priority levels to references based on a layout of a feed document, and the location of the references within that layout. In some embodiments, the resource priority downloading process 140-2, prior to retrieving a feed document, step 501, first subscribes to a feed document, step 505. The resource priority downloading process 140-2 may then retrieve a preview of the feed document, step 506. The feed document represents time-variant chunks of published content. The preview of the feed document includes a layout of the feed document. That is, the preview is not the complete feed document, but rather may be a truncated or shortened version of the feed document. In some embodiments, such a preview means that only a portion of the feed document is available to the user and the resource priority downloading process 140-2 at any time. Alternatively, in other embodiments, the preview of the feed document is a condensed version of the full feed document, and the entirety of this condensed version is available to the user and the resource priority downloading process 140-2.

The resource priority downloading process 140-2 then parses the feed document, either in its entirety, step 502, or in its preview form, to extract one or more references to a downloadable resource, wherein a downloadable resource is a type of content identified by a reference within the feed document. When assigning a priority level to a reference, step 503, the resource priority downloading process 140-2 may assign a priority level to each reference, the priority level based upon a position of the reference to the resource within the layout of the feed document, step 507. For example, the resource priority downloading process 140-2 may assign a high priority to references that are positioned, according to the layout of the feed document, near the top or beginning of the feed document, and lower priority levels to references that are positioned, according to the layout, near the end of the feed document. Such an assignment may be based on the fact that typically a user reads or otherwise views the beginning of a feed document first, and the end of the feed document last. This assignment of priority level by the resource priority downloading process 140-2 allows the user to view resources that the user is seeing when first looking at the feed document before resources positioned later in the feed document, even if those later-positioned resources are smaller in size or are of a file type that is usually assigned a lower priority level. Of course, the resource priority downloading process 140-2 may, after assigning priority levels based on the positions of references, use one or more further considerations, such as file type or size, to refine those priority level assignments. That is, for example, all of the references located within the first page of the feed document according to the layout may all receive a high priority from the resource priority downloading process 140-2, and then, within that group, the highest priority level may be assigned to, for example, any image files, with a lower priority level assigned to audio files, and a further lower priority level assigned to video files. All of those references will still, however, have a higher priority level than one or more references located past page one in the feed document according to the layout.

Alternatively, in some embodiments, the resource priority downloading process 140-2 first receives a position of the feed document in a viewer, the position identifying a portion of the feed document currently displayed in the viewer, step 508. The resource priority downloading process 140-2 then assigns a priority level to each reference, the priority level based upon a position of the reference to the resource within the layout of the feed document and the received position of the feed document in the viewer, step 509. Here, references to resources located, according to the layout, in a portion of the feed document currently shown in the viewer are assigned a higher priority than references to references located, according to the layout, in a portion of the feed document not currently shown in the viewer. That is, the resource priority downloading process 140-2 assigns priority levels so that resources that a user may be currently looking at in the viewer are downloaded before resources that a user is not currently looking at. This allows the resource priority downloading process 140-2 to focus only one certain portions of a feed document at any one time, in particular, the portion of the feed document that a user wishes to view at the current time. In such an arrangement, a video file (for example) located in the currently viewed portion of the feed document may be downloaded before an image file located in a portion of the document not being currently viewed, even though in other situations, that image file would be downloaded first (because it would have been assigned a higher priority level than the video file).

Note that, in some embodiments, temporal layout, as opposed to spatial layout, will determine how the RPDP assigns priority. For example, a feed document may contain a nested resource, which itself contains three references to video files. The nested resource includes instructions that indicate that the first video file should be played to completion when viewing the feed document. Upon completion of playback of the first video file, the second and third video files should be played simultaneously. Thus, the RPDP should assign a higher priority level to the first video file, and a lower (perhaps equal) priority level to the second and third video files. This will cause the RPDP to make sure that the first video file, which must be played back first, is downloaded prior to the second and third video files, which are played back only after the first video file has completed playing. Of course, this example may also be applied to other types of resources contained within a feed document, where there are temporal (that is, time-related) instructions or components to those resources/their respective references.

The resource priority downloading process 140-2 may use any of the techniques described herein as a further way of assigning priority levels to resources represented by references. That is, within the group of references located within a currently viewed portion of a feed document, the resource priority downloading process 140-2 may assign priority levels based on the file type of the resources indicated by those references, or the size of those resources, or both. Note too that resource priority downloading process 140-2 may apply the location-based technique for priority level assignment to feed documents that are not previews of a feed document.

Finally, the resource priority downloading process 140-2 downloads resources for each extracted reference according to the assigned priority levels, wherein a resource for a reference with a higher assigned priority level is downloaded before a resource for a reference with a lower assigned priority level, step 504. In this situation, the resource priority downloading process 140-2 will download resources only for those references for which there are assigned priority levels. That is, the resource priority downloading process 140-2 will not download, for example, an image file that is referenced in a portion of the feed document not currently being viewed, because the resource priority downloading process 140-2 has not assigned a priority level to the reference of that image file. However, should the location of the feed document within the viewer change, such that that particular image file is located in a currently viewed portion of the document, the resource priority downloading process 140-2 would act to assign it an appropriate priority level, and then would download the image file. In this way, the resource priority downloading process 140-2 performs a dynamic assignment of priority levels and performs dynamic downloading as well, all based on the layout of the feed document (or the preview of the feed document) and what portion of the feed document (or the preview of the feed document) is currently being viewed.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A computer-implemented method comprising:
   retrieving a feed document, wherein the feed document represents time variant chunks of published content;
   parsing the feed document to extract references to downloadable resources, wherein parsing the feed document includes: identifying a reference to a first version of a video file, the first version for rendering in accordance with a first video format; and identifying a reference to a second version of the video file, the second version for rendering in accordance with a second video format, the first video format different than the second video format;
   determining a file type associated with the resource identified by each reference;
   assigning a priority level to each reference, wherein the priority level differs depending upon whether the file type of the resource is image, audio, or video, wherein the priority level is further based upon a portion of the feed document currently displayed in a viewer and a reference position within the feed document, wherein references located in the portion are assigned a higher priority than references not located in the portion, wherein assigning the priority level to each reference includes: assigning a first priority level to the reference to the first version of the video file; and assigning a second priority level to the reference to the second version of the video file, the first priority level different than the second priority level; and
   downloading resources for each reference according to the assigned priority levels, wherein resources associated with higher priority references are downloaded before resources with lower priority references.

2. The method of claim 1 further comprising:
   determining if any extracted references are references to a nestable resource;
   parsing any nestable resources to extract one or more references; and
   assigning a priority level to each nestable reference based on the priority level assigned to the reference to the nested resource itself.

3. The method of claim 1 wherein priority level is further based upon resource size.

4. The method of claim 3 further comprising relating each determined file type with a particular size, each related size corresponding to a priority level.

5. The method as in claim 1, wherein assigning the first priority level to the reference to the first version of the video file includes:
   detecting a current instance of an application providing a view of the feed document; and
   upon determining the current instance of the application is more compatible with the first video format than the second video format, identifying the first version of the video file as a higher priority than the second version of the video file.

6. The method as in claim 1, wherein assigning a priority level to each reference, the priority level based upon a position of the reference to the resource within the layout of the feed document includes:
   identifying a first portion of the feed document not currently shown in the viewer, the viewer rendered via a feed document viewer application;
   upon detecting the view has been updated to currently show the first portion of the feed document, identifying at least one reference located in the first portion of the feed document; and
   due to the first portion of the feed document now being visible via the feed document viewer application, increasing a priority level assigned to the at least one reference located in the first portion of the feed document.

7. A computer program product, stored on a non-transitory computer readable medium, the computer program product comprising:
   computer program code for retrieving a feed document, wherein the feed document represents time variant chunks of published content;
   computer program code for parsing the feed document to extract references to downloadable resources, wherein parsing the feed document includes: identifying a reference to a first version of a video file, the first version for rendering in accordance with a first video format; and identifying a reference to a second version of the video file, the second version for rendering in accordance with a second video format, the first video format different than the second video format;
   computer code for determining a file type associated with the resource identified by each reference;
   computer program code for assigning a priority level to each reference, wherein the priority level differs depending upon whether the file type of the resource is image, audio, or video, wherein the priority level is further based upon a portion of the feed document currently displayed in a viewer and a reference position within the feed document, wherein references located in the portion are assigned a higher priority than references not located in the portion, wherein assigning the priority level to each reference includes: assigning a first priority level to the reference to the first version of the video file; and assigning a second priority level to the reference to the second version of the video file, the first priority level different than the second priority level; and
   computer program code for downloading resources for each reference according to the assigned priority levels, wherein resources associated with higher priority references are downloaded before resources with lower priority references.

8. The computer program product of claim 7 wherein computer program code for parsing comprises:
   computer program code for determining if any extracted references are references to a nestable resource;
   computer program code for parsing any nestable resources to extract one or more references; and
   and wherein computer program code for assigning comprises:
   computer program code for assigning a priority level to each nestable reference based on the priority level assigned to the reference to the nested resource itself.

9. The computer program product of claim 7 wherein priority level is further based upon resource size.

10. The computer program product of claim 9 further comprising computer program code for relating each determined file type with a particular size, each related size corresponding to a priority level.

11. A computer system comprising:
a processor;
a memory system;
a display;
an input device; and
an interconnection mechanism coupling the memory, the processor, the display, and the input device, allowing communication there between;
wherein the memory system is encoded with a resource priority downloading application, that when executed in the processor, provides a resource priority downloading process that downloads resources according to a priority, by causing the computer system to perform the operations of:
retrieving a feed document, wherein the feed document represents time variant chunks of published content;
parsing the feed document to extract to downloadable resources, wherein parsing the feed document includes: identifying a reference to a first version of a video file, the first version for rendering in accordance with a first video format; and identifying a reference to a second version of the video file, the second version for rendering in accordance with a second video format, the first video format different than the second video format;
determining a file type associated with the resource identified by each reference;
assigning a priority level to each reference, wherein the priority level differs depending upon whether the file type of the resource is image, audio, or video, wherein the priority level is further based upon a portion of the feed document currently displayed in a viewer and a reference position within the feed document, wherein references located in the portion are assigned a higher priority than references not located in the portion, wherein assigning the priority level to each reference includes: assigning a first priority level to the reference to the first version of the video file; and assigning a second priority level to the reference to the second version of the video file, the first priority level different than the second priority level; and
downloading resources for each reference according to the assigned priority levels, wherein resources associated with higher priority references are downloaded before resources with lower priority references.

12. The computer system of claim 11 the operations further comprising:
determining if any extracted references are references to a nestable resource;
parsing any nestable resources to extract one or more references; and
assigning a priority level to each nestable reference based on the priority level assigned to the reference to the nested resource itself.

13. The computer system of claim 11 wherein priority level is further based upon resource size.

14. A computer-implemented method comprising:
retrieving a feed document, wherein the feed document represents time variant chunks of published content;
parsing the feed document to extract references to downloadable resources, wherein parsing the feed document includes: extracting a nested reference, the nested reference containing multiple internal references, wherein each internal reference comprises a link to a remotely located video file, the nested reference further indicating an order of playback with respect to each of the remotely located video files;
determining a file type associated with the resource identified by each reference;
assigning a priority level to each reference, wherein the priority level differs depending upon whether the file type of the resource is image, audio, or video, wherein the priority level is further based upon a portion of the feed document currently displayed in a viewer and a reference position within the feed document, wherein references located in the portion are assigned a higher priority than references not located in the portion, wherein assigning the priority level to each reference includes: assigning a priority level to each internal reference based on the order of playback; and
downloading resources for each reference according to the assigned priority levels, wherein resources associated with higher priority references are downloaded before resources with lower priority references.

15. The method as in claim 14, wherein assigning a priority level to each internal reference based on the order of playback includes:
assigning a first priority level to a first internal reference to a first video file;
assigning a second priority level to a second internal reference to a second video file;
assigning a third priority level to a third internal reference to a third video file, wherein the order of playback indicates the first video file is to be completely played back prior to simultaneous playback of both the second video file and the third video, wherein the first priority level is higher than both the second priority level and the third priority level.

16. A computer-implemented method comprising:
retrieving a feed document;
parsing the feed document to extract references to downloadable resources, wherein parsing the feed document comprises extracting a nested reference, the nested reference containing multiple internal references to additional downloadable resources, the nested reference further indicating an order of use with respect to each of the additional downloadable resources;
assigning a priority level to each reference, wherein assigning the priority level to each reference comprises assigning a priority level to each internal reference based on the order of use; and
downloading resources for each reference according to the assigned priority levels, wherein resources associated with higher priority references are downloaded before resources with lower priority references.

17. The method of claim 16 wherein each internal reference is a link to a remotely located video file.

18. The method of claim 17 wherein the order of use comprises an order of playback of remotely-located video files referenced by the internal references contained in the nested reference.

* * * * *

UNITED STATES PATENT AND TRADEMARK OFFICE
CERTIFICATE OF CORRECTION

| | | |
|---|---|---|
| PATENT NO. | : 8,145,631 B2 | Page 1 of 1 |
| APPLICATION NO. | : 12/032440 | |
| DATED | : March 27, 2012 | |
| INVENTOR(S) | : Riggs | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 367 days.

Signed and Sealed this
Twenty-ninth Day of May, 2012

David J. Kappos
*Director of the United States Patent and Trademark Office*